United States Patent
Eubank et al.

(10) Patent No.: US 12,061,278 B1
(45) Date of Patent: *Aug. 13, 2024

(54) ACOUSTIC IDENTIFICATION OF AUDIO PRODUCTS

(71) Applicant: Apple Inc., Cupertino, CA (US)

(72) Inventors: Christopher T. Eubank, Mountain View, CA (US); Martin E. Johnson, Los Gatos, CA (US); Daniel K. Boothe, San Francisco, CA (US); Jonathan D. Sheaffer, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/346,162

(22) Filed: Jun. 30, 2023

Related U.S. Application Data (63) Continuation of application No. 17/464,559, filed on Sep. 1, 2021, now Pat. No. 11,726,161.

(60) Provisional application No. 63/082,392, filed on Sep. 23, 2020.

(51) Int. Cl.
*G01S 3/808* (2006.01)
*G06F 16/68* (2019.01)
*H04R 3/00* (2006.01)
*H04S 7/00* (2006.01)

(52) U.S. Cl.
CPC .......... *G01S 3/8083* (2013.01); *G06F 16/686* (2019.01); *H04R 3/005* (2013.01); *H04S 7/301* (2013.01)

(58) Field of Classification Search
CPC ..... G01S 3/8083; G06F 16/686; H04R 3/005; H04S 7/301
See application file for complete search history.

(56) References Cited

U.S. PATENT DOCUMENTS

| | | |
|---|---|---|
| 9,723,420 B2 | 8/2017 | Family et al. |
| 9,961,472 B2 | 5/2018 | Johnson et al. |
| 10,061,009 B1 | 8/2018 | Family et al. |
| 10,542,365 B2 | 1/2020 | Family et al. |

(Continued)

FOREIGN PATENT DOCUMENTS

CN 113069751 A 7/2021

*Primary Examiner* — Daniel Pihulic
(74) *Attorney, Agent, or Firm* — Aikin & Gallant, LLP (57) ABSTRACT

Disclosed are techniques for a multimedia device with audio and video capturing capability to identify an audio device based on acoustic playback signal if the audio device cannot be identified from captured video. The multimedia device may assemble a list of candidate audio devices that are a possible match for the observed audio device from a database of previously recognized audio devices and may transmit commands to the candidate audio devices to play acoustic identification signals. The acoustic identification signals may be audible sound or ultrasonic tone sequences with embedded identification information unique to each audio device. The multimedia device may record and analyze the acoustic identification signals received from any of the candidate audio devices to construct metrics to select the most likely candidate for the observed audio device. The metrics may include time of flight, direction of arrival, received amplitude, direct-to-reverberant ratio (DRR) of the acoustic identification signals.

20 Claims, 6 Drawing Sheets

(56) References Cited

U.S. PATENT DOCUMENTS

| | | | |
|---|---|---|---|
| 11,726,161 B1* | 8/2023 | Eubank | H04W 4/20 |
| | | | 367/125 |
| 11,832,082 B2* | 11/2023 | Sheaffer | H04R 1/406 |
| 2010/0309975 A1* | 12/2010 | Zhou | H04N 19/124 |
| | | | 375/240.03 |
| 2014/0122087 A1 | 5/2014 | Macho | |
| 2022/0053281 A1* | 2/2022 | Sheaffer | H04R 1/1008 |

* cited by examiner

ACOUSTIC IDENTIFICATION OF AUDIO PRODUCTS

CROSS REFERENCE TO RELATED APPLICATIONS

This application is a continuation of co-pending U.S. patent application Ser. No. 17/464,559, filed Sep. 1, 2021, which claims the benefit of priority of U.S. Provisional Application No. 63/082,392 filed on Sep. 23, 2020, the disclosure of which is incorporated herein by reference in its entirety.

FIELD

This disclosure relates to the field of audio communication; and more specifically, to methods for an audio-visual device to identify other audio communication devices based on acoustic signals played by the audio communication devices. Other aspects are also described.

BACKGROUND

Audio communication devices such as smartphones, home assistant devices, desktop computers, laptops, etc., are voice controlled digital devices that may be controlled by users issuing speech commands to the devices. For example, users may issue voice commands to the devices to make phone calls, send messages, play media content, obtain query responses, get news, setup reminders, etc. Situations may arise where users want to use other consumer electronic devices with video, audio or wireless capabilities, such as smartphones to control audio communication devices.

SUMMARY

Disclosed are aspects of a method for multimedia devices with audio/video capturing capability to identify audio communication devices based on acoustic playback signals generated by the audio communication devices when the audio communication devices cannot be identified by visual images alone. The multimedia devices may be smartphones, tablets, wearable devices, audio/video home assistant devices, laptops, etc., that may recognize one or more audio communication devices captured within their camera's field of view. The audio communication devices may be smart assistant devices, smart speakers, smartphones, or other audio playback devices that are capable of being controlled by the multimedia devices to play audio content, answer queries, etc. For example, when a smartphone visually observes a smart assistant device within its field of view, the smartphone may wish to identify the smart assistant device to determine if the smart assistant device is controllable by the smartphone.

In one aspect, the smartphone may determine if the smart assistant device could be identified based on information from the visual observation alone. For example, the smartphone may try to identify the observed smart assistant device from a database of smart assistant devices associated with a user of the smartphone. If the observed smart assistant device cannot be identified, the smartphone may command the smart assistant device to acoustically identify itself by playing audio identification signals. In one aspect, the smartphone may assemble a list of candidate smart assistant devices that are a possible match for the observed smart assistant device from the database of smart assistant devices associated with the user of the smartphone. In one aspect, the list of candidate smart assistant devices may include smart assistant devices not associated with the user but are selected based on characteristics of the wireless signals detected in the local environment of the smart assistance device. The smartphone may wirelessly transmit identification commands to the candidate smart assistant devices to solicit the generation of the acoustic identification signals.

The candidate smart assistant devices, which may be located within or outside of the local acoustic environment of the smartphone, may each play an acoustic identification signal at a pre-determined level upon receiving the identification commands. The acoustic identification signals may be audible sound, or near-ultrasonic or ultrasonic tone sequences with embedded identification information unique to each smart assistant device. In one aspect, the identification commands from the smartphone may include requests for additional metadata associated with the acoustic identification signals, such as playback timestamps, encryption keys for encrypting the metadata, etc. The candidate smart assistant devices may transmit the requested metadata wirelessly to the smartphone including playback timestamps, encoded signature information, or representation of the acoustic identification signals to aid the smartphone in receiving the acoustic identification signals from the candidate smart assistant devices.

The smartphone may configure a microphone array to steer a beam-formed capture towards the direction of the observed smart assistant device. In one aspect, the smartphone may use the camera's field of view to fine tune the direction of the microphone beam-forming. The smartphone may record and analyze the acoustic identification signals and any metadata received from the candidate smart assistant devices to construct a set of information or metrics used to select the most likely candidate for the observed smart assistant device. In one aspect, the set of metrics may include the time of flight of an acoustic identification signal based on its time of arrival and the corresponding playback timestamp metadata, direction of arrival derived from the microphone array, received amplitude level of the acoustic identification signal, spectral content of the received acoustic identification signal relative to that of the transmitted acoustic identification signal, direct-to-reverberant ratio (DRR) of the acoustic identification signal, etc., taking into consideration the distance of the observed smart assistant device as estimated from the camera image.

Advantageously, multimedia devices such as the smartphone may determine from the acoustic identification signals generated by a pool of audio communication devices the identity of a visually observed audio communication device. The smartphone may display a graphical interface to allow a user of the smartphone to control the identified audio communication device, or may allow the user to control the identified audio communication device using voice commands, facilitating the interaction between the user and the audio communication device. While aspects of the disclosure are illustrated using a smartphone, other multimedia devices such as a head mounted display (HMD), smart glasses, or other augmented reality (AR) devices may also be used.

In one aspect, a method for identifying a target audio device is disclosed. The method includes capturing by an observing device an image of the target audio device. The method also includes determining candidate audio devices that may match the target audio device and transmitting a command to the candidate audio devices to play acoustic identification signals. The method further includes processing the acoustic identification signals received from any of the candidate audio devices to generate corresponding metrics for the candidate audio devices whose acoustic identification signals are received. The method further includes determining one of the candidate audio devices as the target audio device based on the corresponding metrics and the image of the target audio device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

It is desirable for multimedia devices such as smartphones, tablets, wearable devices, or other devices with audio and video capturing capability to identify smart speakers, virtual assistant devices, or other audio communication devices that come within the field of view of the cameras or image sensors of the multimedia devices. For example, a user carrying a mobile phone may see a home assistant device in a room and may wish to know if the observed device belongs to the user, or if the user has multiple home assistant devices, which of these home assistant devices is the observed device. The observed device may not have a highly directional wireless capability that would allow the mobile phone to identify the device as the one appearing within the camera's field of view. Even if the observed device has that capability, the mobile phone may observe multiple audio devices that are similar in appearance and in close proximity, making it difficult to distinguish between the observed devices.

Systems and methods are disclosed for a multimedia device with audio and video capturing capability to identify an observed audio communication device based on acoustic identification signals when the audio communication device cannot be uniquely identified based on captured image data or wireless data of the audio communication device. The multimedia device may determine a list of candidate audio communication devices that are a possible match for the observed audio communication device based on the captured image data, detected wireless signals, a known location of the multimedia device, audio communication devices previously recognized or associated with the user, etc. The multimedia device may send commands to the candidate audio communication devices through a wide-area network or peer-to-peer local links to solicit the generation of acoustic identification signals from the candidate audio communication devices.

The candidate audio communication devices may play acoustic identification signals simultaneously or sequentially. In one aspect, the candidate audio communication devices may wirelessly transmit metadata such as playback timestamps, encoded signature information, or representation of the acoustic identification signals that may be used as an aid by the multimedia device to receive the acoustic identification signals. The multimedia device may detect, one, multiple, or no acoustic identification signals depending on whether and how many of the candidate audio communication devices are in the same acoustic environment as the multimedia device. If there is at least one acoustic identification signal received, the multimedia device may analyze the acoustic identification signal to compute metrics that may be used to identify which of the candidate audio communication devices is the most likely match to the observed device. In one aspect, the metrics may include the time of flight, direction of arrival, received amplitude level, received spectral content relative to transmitted spectral content, direct-to-reverberant ratio (DRR) of each acoustic identification signal, etc., in view of the distance of the observed smart assistant device as estimated from the camera image.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Figure 1:
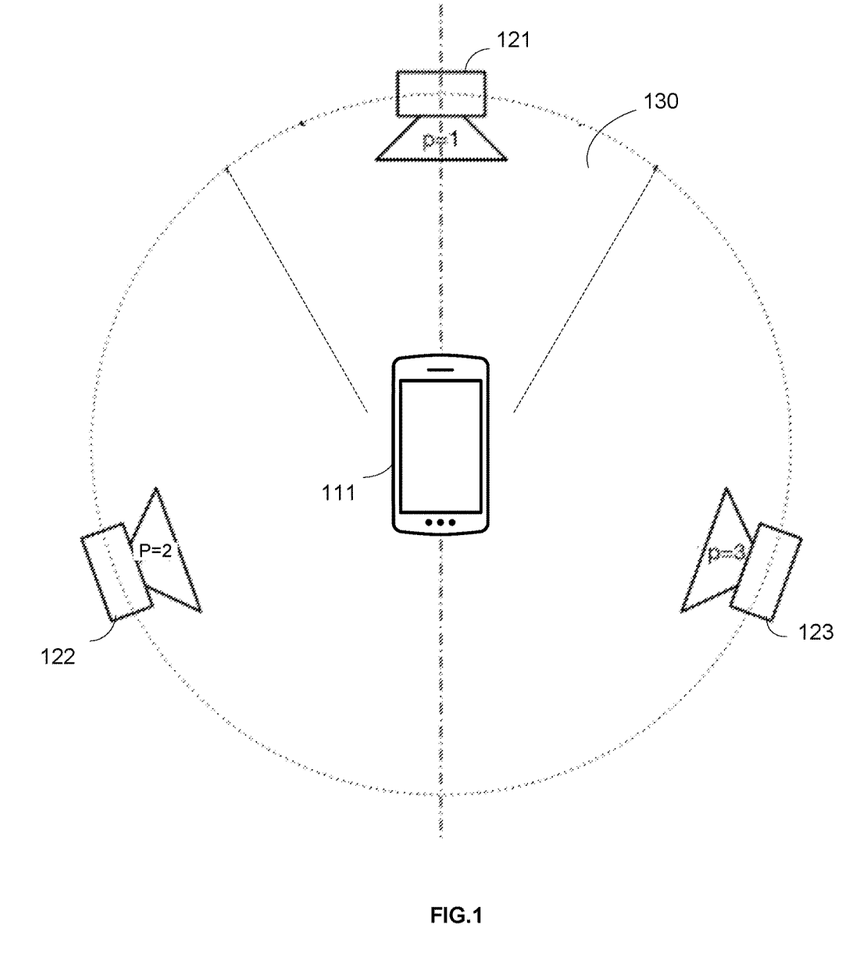
FIG. 1 depicts a scenario of an electronic device that desires to identify an observed audio communication device in a local environment containing multiple audio communication devices according to one aspect of the disclosure.

FIG. 1 depicts a scenario of an electronic device 111 that desires to identify an observed audio communication device 121 in a local environment containing multiple audio communication devices according to one aspect of the disclosure. The electronic device 111 may include a display and one or more image sensors (e.g., a camera) for capturing videos and/or images of a physical setting surrounding the electronic device 111. When the electronic device 111 is an AR device, virtual objects may be generated and superimposed over the videos and/or images of the physical setting on the display, or added to the user's direct view of the physical setting through a transparent or translucent display. For example, image sensors of the electronic device 111 may capture the audio communication device 121 within a field of view 130 of the image sensors. Two other audio communication devices 122 and 123 may be present in the local environment but are outside of the current field of view 130. The local environment may refer to the acoustic environment surrounding the electronic device 111, such as a room, in which the electronic device may issue voice commands to, and may detect acoustic signals from, audio communication devices in the local environment. The electronic device 111 may run an object recognition algorithm on the captured image of the audio communication device 121 to determine if the audio communication device 121 has previously been identified, such as a smart speaker associated with a user of the electronic device 111.

In one aspect, neural networks may be utilized to recognize the audio communication device 121 based on the model type, serial number, or other distinguishing physical features of the audio communication device 121 captured in the image data. In one aspect, neural networks may recognize the surrounding physical environment such as a painting behind the audio communication device 121, a table it is sitting on, or may use other machine learning metrics to determine if an audio communication device in the same or similar physical environment has previously been identified in an internal image recognition database. In one aspect, the electronic device 111 may attempt to identify the audio communication device 121 from a database of recognized audio communication devices associated with the user using metadata such as position information or timestamps when the recognized audio communication devices were last powered-on, and by comparing the metadata against the current position of the electronic device 111 or the audio communication device 121 and the current time.

In one aspect, the electronic device 111 may attempt to identify the audio communication device 121 based on the strength or directionality of wireless signals such as Bluetooth or WiFi signals that may be transmitted by the audio communication device 121. The electronic device 111 may estimate the strength or directionality of the transmitted wireless signals based on the distance of the audio communication device 121 as estimated from the captured image data and the strength and directional variation of the wireless signals received. The electronic device 111 may compare the strength or directionality of the wireless signals from the audio communication device 121 against the metadata from the database of recognized audio communication devices associated with the user to determine if the audio communication device 121 can be identified.

If the electronic device 111 can recognize the audio communication device 121, the electronic device 111 may display a virtual object such as a green light enveloping the audio communication device 121 to indicate to the user that the user may interact with the audio communication device 121. The user may directly issue voice commands to the audio communication device 121 or the electronic device 111 may respond to deictic commands from the user to control the audio communication device 121. In one aspect, the electronic device 111 may display a graphical interface on the display to allow the user to control the audio communication device 121, such as to change the volume or the directionality of the audio played from the audio communication device 121.

If the audio communication device 121 cannot be recognized from the database of audio communication devices associated with the user of the electronic device 111, or if it cannot be uniquely identified based on the image data or the wireless signals, the electronic device 111 may initiate a sequence to identify the audio communication device 121 using acoustic identification signals. The electronic device 111 may assemble from the database a list of candidate audio communication devices that is a possible match for the audio communication device 121. For example, the electronic device 111 may assemble the list of candidate audio communication devices based on the similarity of their physical characteristics to the audio communication device 121, similarity in wireless capability such as the Bluetooth or WiFi networking capability of the candidate audio communication devices compared with the type, strength, or directionality of wireless signals detected in the room, proximity of the candidate audio communication devices' last known locations to the location of the audio communication device 121 as estimated from the position (e.g., using GPS, cellular, or local area networking signals) of the electronic device 111, etc. In one aspect, one or more candidate audio communication devices may not be obtained from the database of recognized audio communication devices associated with the user but instead may be obtained based on characteristics of the wireless signals such as Bluetooth or WiFi signals detected from the audio communication device 121 or in the local environment.

The electronic device 111 may transmit a command to each candidate audio communication device to play an acoustic identification signal. Because the candidate audio communication devices may be in a different acoustic environment such as in a different room from the electronic device 111, or may be outside of the range of the local networking signals, the electronic device 111 may wirelessly transmit the identification commands to the candidate audio communication devices through a wide-area network, a local area network, or peer-to-peer local links. In one aspect, the electronic device 111 may generate the command as an audio command since any matching candidate audio communication device must be in the same local acoustic environment. The electronic device 111 may transmit the commands to the candidate audio communication devices simultaneously such as through a multicast packet or sequentially in time. In one aspect, instead of transmitting a command, the electronic device 111 may stream identification acoustic sequence through each candidate audio communication device using the local wireless network or peer-to-peer local links to solicit the candidate audio communication devices to playback the identification signals acoustically.

In one aspect, the commands may include metadata such as requests for playback timestamps, requests for information about the acoustic identification signals or unique fingerprinting sequences embedded in the acoustic identification signals, encryption keys to be used for encrypting the fingerprinting sequences, selection method for the fingerprinting sequences, etc. The electronic device 111 may use the requested information such as information about the acoustic identification signals, the fingerprinting sequences or the playback timestamps received from a candidate audio communication devices to aid in receiving and recovering the acoustic identification signal transmitted by the candidate audio communication device from a mixed signal containing the acoustic identification signals transmitted by other candidate audio communication devices, in associating the received acoustic identification signals with the candidate audio communication device, or in estimating the distance to the candidate audio communication device.

The candidate audio communication devices, which may be located within or outside of the local acoustic environment of the electronic device 111, may each play an acoustic identification signal at a pre-determined level upon receiving the identification commands (e.g., 80 dBA). For example, the candidate audio communication devices, which may include the observed audio communication device 121 and one or more of unobserved audio communication devices 122 and 123 in the room, may each play an acoustic identification signal. In one aspect, the acoustic identification signals may be aesthetically designed audible sound effects that are identical between the candidate audio communication devices. The candidate audio communication devices may be commanded to play the audible sound effects in sequence (e.g., temporally separated playback slots) if the audible sound effects between the candidate audio communication devices are indistinguishable.

In one aspect, the acoustic identification signals may be inaudible high-frequency, near-ultrasonic, or ultrasonic sequences of tones modulated using frequency shift keying (FSK) or phase shift keying (PSK). The sequence of tones may embed identification information or fingerprinting information that are unique to each candidate audio communication device or for each command invocation. In one aspect, the acoustic identification signals may include aesthetically designed audible sound effects with embedded fingerprinting sequence. The candidate audio communication devices may be commanded to play the inaudible or audible sound with embedded fingerprinting sequence simultaneously or separated temporally. In one aspect, if a candidate audio communication device is already playing music, the fingerprinting sequence may be embedded as inaudible frequency tones. The fingerprinting sequence may be selected by the candidate audio communication devices or by the electronic device 111 through the metadata of the identification command. In one aspect, the fingerprinting sequence may be encrypted, such as using encryption keys received in the metadata.

If the electronic device 111 transmits metadata in the identification commands requesting playback timestamps, or information about the acoustic identification information or fingerprinting sequences embedded in the acoustic identification signals, the candidate audio communication devices may transmit the requested information wirelessly as metadata to the electronic device 111 through a wide-area network, a local area network, or peer-to-peer local links. The playback timestamps may include the timestamps at which the acoustic identification signals are played. The time of the electronic device 111 and the time of the candidate audio communication devices may be synchronized such that the electronic device 111 may use differences between the timestamps of the reception of the acoustic identification signals and the playback timestamps to estimate the distances to the corresponding candidate audio communication devices.

In one aspect, the requested information about the acoustic identification signals may be represented as pulse-code modulation (PCM) of the acoustic identification signals. In one aspect, the requested information about the fingerprinting sequences may be encoded. In one aspect, the requested metadata may be modulated using FSK or PSK. The electronic device 111 may demodulate the PCM of the acoustic identification signal or decode the fingerprinting sequence for a candidate audio communication device for use as a reference signal to receive and recover the acoustic identification signal from the candidate audio communication device. In one aspect, the acoustic identification signals or the fingerprinting sequences of the candidate audio communication devices may be orthogonal to one another to aid in their recovery.

To facilitate the identification of the observed audio communication device 121, the electronic device 111 may configure a microphone array to steer a beam-formed capture towards the direction of the observed audio communication device 121. In one aspect, the electronic device 111 may use the field of view 130 to fine tune the direction of the microphone beam-forming. The electronic device 111 may record and analyze the acoustic identification signals with the aid of metadata received from the candidate audio communication devices to construct a set of metrics used to select the most likely candidate audio communication device for the observed audio communication device 121.

In one aspect, the metrics may include the time of flight of the acoustic identification signal based on the difference in the timestamp of arrival and the playback timestamp received in the metadata from the corresponding candidate audio communication device. In one aspect, the metrics may include the direction of arrival of the acoustic identification signals derived from the microphone array, the received amplitude level of the acoustic identification signal, the direct-to-reverberant ratio (DRR) of the acoustic identification signal, etc. In one aspect, the metrics may include the spectral content of the acoustic identification signal received by the electronic device 111 relative to that of the acoustic identification signal transmitted from the corresponding candidate audio communication device. The spectral content of the acoustic identification signals as transmitted by a candidate audio communication device may be determined from the metadata received by the electronic device 111 from the candidate audio communication device. The time of flight and the direction of arrival of the acoustic identification signal from a candidate audio communication device may be compared with the distance and the direction of the observed audio communication device 121 as estimated from the captured image within the field of view 130 to generate a confidence level for the candidate audio communication device. In one aspect, the set of metrics may be determined with the aid of the acoustic identification signals or the fingerprinting sequences obtained from the metadata.

In one aspect, determining the DRR of an acoustic identification signal may include extracting a direct component and a reverberant component from the acoustic identification signal. The direct component may refer to a sound field that has a single sound source with a single direction, or a high directivity, for example, without any reverberant sounds. A reverberant component may refer to secondary effects of room geometry on sound, for example, when sound energy reflects off of surfaces and causes reverberation and/or echoing. A trained neural network may generate measured acoustic parameters (e.g., DRR) of the physical environment based on the extracted direct component and the extracted reverberant component. In one aspect, the measured acoustic parameters may include characteristics of the reverberation measurement such as a reverberation decay rate or time. In one aspect, the measured acoustic parameters of the physical environment may be generated corresponding to one or more frequency ranges of the acoustic identification signals. In this manner, each frequency range (for example, a frequency band or bin) may have the corresponding acoustic parameters (e.g. DRR, decay rate, or other acoustic parameters).

To select the most likely candidate audio communication device for the observed audio communication device 121, the electronic device 111 may eliminate any candidate audio communication devices from which the electronic device 111 did not receive an acoustic identification signal. The electronic device 111 did not receive an acoustic identification signal from a candidate audio communication device when the electronic device 111 could not extract the acoustic identification signal using the fingerprinting sequence unique to that candidate audio communication device (e.g., when multiple candidate audio communication devices are transmitting the acoustic identification signals simultaneously) or when there is silence in a playback time slot assigned to the candidate audio communication device (e.g., when the candidate audio communication devices are transmitting in timed sequence).

For a candidate audio communication device from which an acoustic identification signal is received, the electronic device 111 may compute a score based on the combination of the metrics. One component of the score may reflect the degree of likelihood that the direction of arrival of the acoustic identification signal from the candidate audio communication device corresponds to the direction of the observed audio communication device 121 as estimated from the captured image or corresponds to the field of view 130 of the electronic device 111. In one aspect, the electronic device 111 may determine if the time of flight from the candidate audio communication device is within an estimated distance threshold. The estimated distance threshold may be determined from the distance of the observed audio communication device 121 as estimated from the captured image. Thus, another component of the score may reflect the degree of correspondence between the time of flight from the candidate audio communication device and the estimated distance to the observed audio communication device 121.

In one aspect, the electronic device 111 may determine if the received amplitude level of the acoustic identification signal from the candidate audio communication device is within an estimated amplitude threshold. The estimated amplitude threshold may be determined from the estimated distance to the observed audio communication device 121 or from a room acoustic model. Thus, another component of the score may reflect the degree of correspondence between the received amplitude level from the candidate audio communication device and an estimated amplitude level from the observed audio communication device 121. Alternatively, one component of the score may reflect the loudness of the received amplitude level when the microphone array is beam-formed toward the observed audio communication device 121.

In one aspect, the electronic device 111 may determine if the spectral content of the received acoustic identification signal relative to that of the transmitted acoustic identification signal from the candidate audio communication device is within an expected range for one or more frequency bands. The expected range of the spectral content of the received acoustic identification signal for the one or more frequency bands may be determined from the estimated distance to the observed audio communication 121 or from the room acoustic model. In one aspect, the electronic device 111 may consider the magnitude of only the high frequencies of the received acoustic identification signal when computing the score or the heuristics used to rank the candidate audio communication devices. Thus, one component of the score may reflect the degree of correspondence between the spectral content of the acoustic identification signal received from the candidate audio communication device and an estimated spectral content from the observed audio communication device 121.

In one aspect, the electronic device 111 may perform a secondary check on the received amplitude level by steering the beam of the microphone array to multiple directions and re-analyzing the recorded acoustic information signals to confirm that the direction associated with the visual field of view 130 is the loudest. For example, if the observed audio communication device 121 is not plugged in but the microphone array is beam-formed toward the observed audio communication device 121, when the electronic device 111 receives the acoustic identification signal from the unobserved audio communication device 123, the electronic device 111 may assume that there is a candidate audio communication device at about 45° azimuth angle outside the field of view 130. When the recorded acoustic information signals are re-analyzed with the direction of the beam steered toward the unobserved audio communication device 123, the electronic device 111 may determine that the direction associated with the loudest received acoustic identification signal does not align with the visual field of view 130.

In one aspect, the electronic device 111 may determine if the DRR of the acoustic identification signal from the candidate audio communication device is within an estimated DRR threshold. The DRR threshold may be determined from the measured acoustic parameters due to the room geometry. Thus, one component of the score may reflect the degree of correspondence between the DRR of the acoustic identification signal from the candidate audio communication device and an estimated DRR of signals from the observed audio communication device 121.

The electronic device 111 may compare the scores associated with the candidate audio communication devices from which acoustic identification signals are received to determine the most likely matching candidate audio communication device for the observed audio communication device. The higher the score associated with a candidate audio communication device, the higher the confidence that the candidate audio communication device is the observed audio communication device 121. Once the observed audio communication device 121 is identified, the electronic device 111 may indicate as such to the user and may display a graphical interface to allow the user to control the audio communication device 121, or may allow the user to control the audio communication device 121 using voice commands. The electronic device 111 may add or update an entry for the audio communication device 121 in the database of recognized audio communication devices associated with the user with metadata such as position information determined from the position of the electronic device 111, timestamp of the identification, features such as the strength and directionality of wireless signals (e.g., Bluetooth or WiFi) detected, etc. The metadata may be used for future identification of the audio communication device 121.

Figure 2:
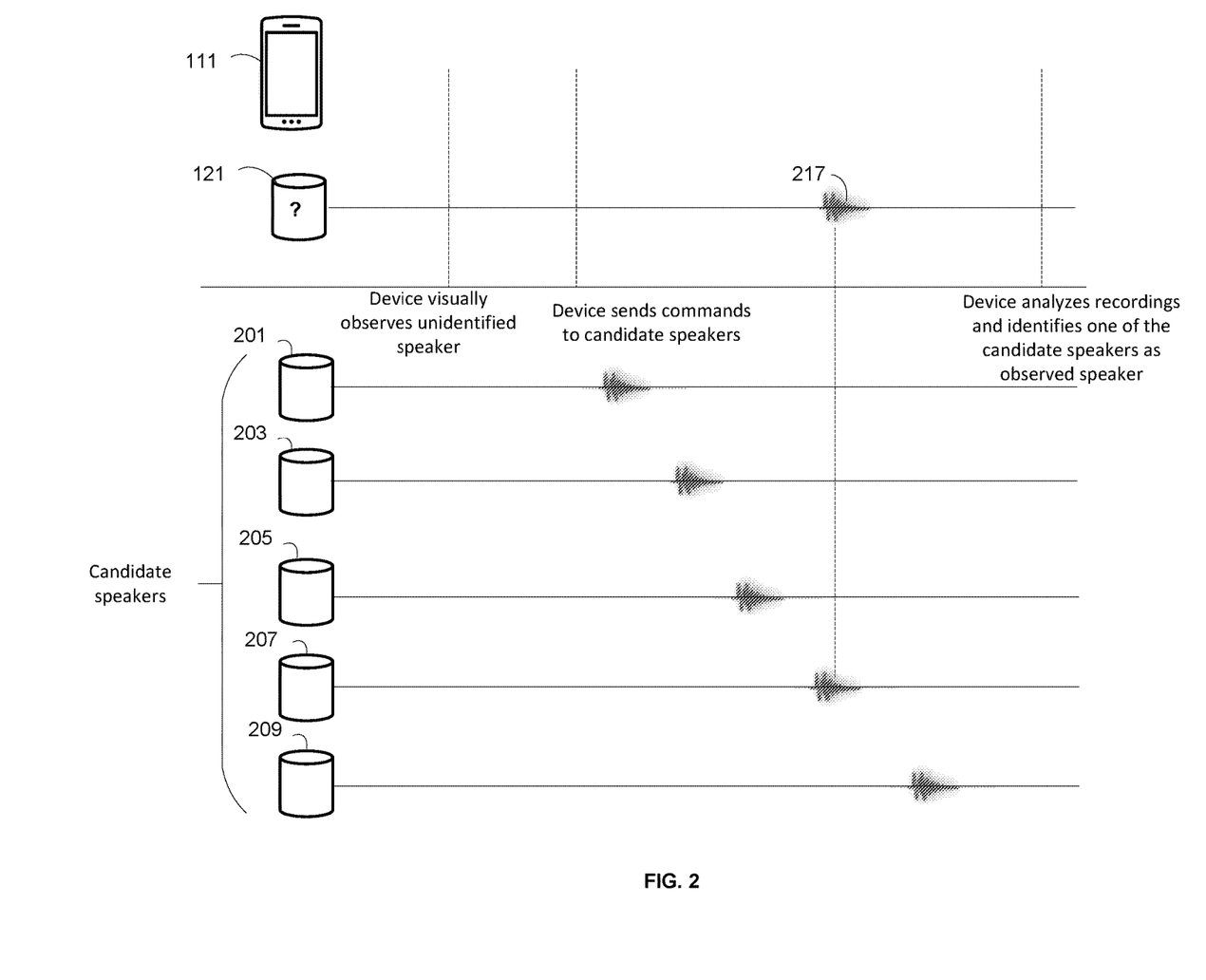
FIG. 2 depicts the electronic device receiving an acoustic identification signal from one candidate audio communication device among multiple candidate audio communication devices to identify the one candidate audio communication device as the observed audio communication device according to one aspect of the disclosure.

FIG. 2 depicts the electronic device 111 receiving an acoustic identification signal from one candidate audio communication device among multiple candidate audio communication devices to identify the one candidate audio communication device as the observed audio communication device 121 according to one aspect of the disclosure. In FIG. 2. The electronic device 111 visually observes the audio communication device 121 in a room but is unable to identify it based on the visual image or based on the strength or directionality of the wireless signals in the room. The electronic device 111 may generate a list of candidate audio communication devices 201, 203, 205, 207, and 209 that may be a match for the observed audio communication device 121 from a database of audio communication devices associated with the user of the electronic device 111. The candidate audio communication devices 201, 203, 205, 207, and 209 may be selected based on the similarity of their physical characteristics to the observed audio communication device 121, similarity in their wireless capability to that observed in the room, the proximity of their last known locations to the location of the observed audio communication device 121, etc.

The electronic device 111 may transmit commands to each candidate audio communication device 201, 203, 205, 207, and 209 to play an acoustic identification signal in sequence through a wide-area network, a local area network, or peer-to-peer local links. The commands may include requests for metadata such as playback timestamps, information about the acoustic identification signals or unique fingerprinting sequences embedded in the acoustic identification signals, etc. The candidate audio communication devices 201, 203, 205, 207, and 209, which may be located within or outside of the local acoustic environment of the electronic device 111 such as in a different room, may each play an acoustic identification signal at a pre-determined level upon receiving the identification commands. If the commands from the electronic device 111 include requests for metadata, the candidate audio communication devices 201, 203, 205, 207, and 209 may transmit the metadata wirelessly through the wide-area network, local-area network, or peer-to-peer local links. The electronic device 111 may use the metadata received from a candidate audio communication device to aid in recovering and receiving the acoustic identification signal transmitted by the candidate audio communication device from the acoustic identification signals transmitted by other candidate audio communication devices.

If candidate audio communication device 207 is the only audio communication device in the local acoustic environment of the electronic device 111 (e.g., in the same room), the electronic device 111 may receive only the acoustic identification signal 217 from candidate audio communication device 207 in the playback time slot assigned to candidate audio communication device 207. The electronic device 111 may detect silence in the playback time slots assigned to candidate audio communication devices 201, 203, 205, and 209. The electronic device 111 may record and analyze the acoustic identification signal 217, with the aid of metadata if available, to construct a set of metrics for the candidate audio communication device 207. The metrics may include the time of flight, direction of arrival, received amplitude, received spectral content relative to transmitted spectral content, DDR, etc., of the acoustic identification signal 217. The electronic device 111 may compute a confidence score for candidate audio communication device 207 based on the metrics, the estimated distance and direction to the observed audio communication device 121, and the room geometry. The confidence score may indicate the degree of confidence that the candidate audio communication device 207 is the observed audio communication device 121. In one aspect, the electronic device 111 may compute a detection threshold. If the score for candidate audio communication device 207 exceeds the detection threshold, the electronic device 111 may identify the candidate audio communication device 207 as the observed audio communication device 121. In one aspect, if the confidence score for candidate audio communication device 207 is below the detection threshold but above a lower confidence threshold, the electronic device 111 may prompt the user for manual verification of the candidate communication device 207 or to request additional intervention by flashing light on the electronic device 111, playing a sound effect, or through other visual or audible signals.

Figure 3:
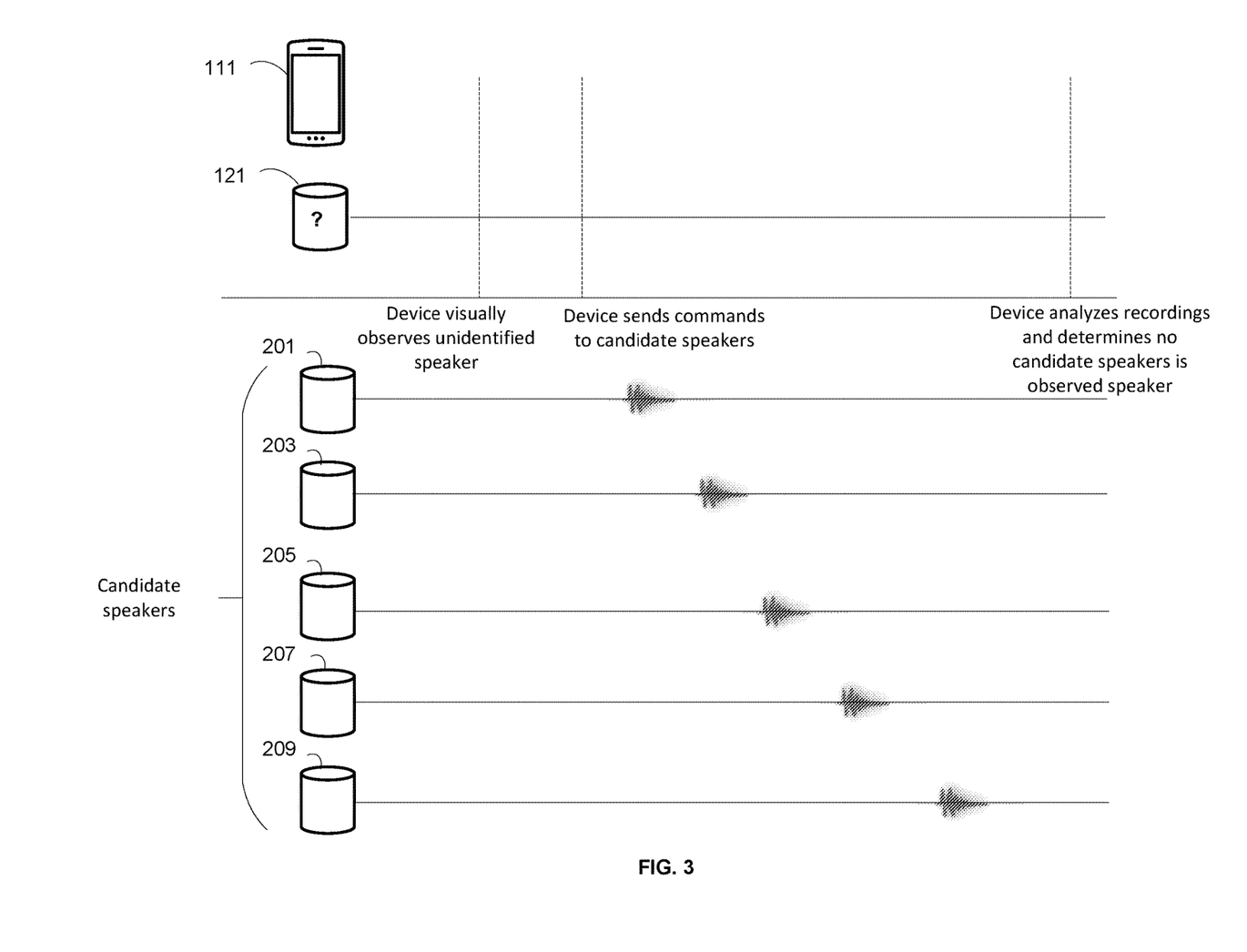
FIG. 3 depicts the electronic device receiving no acoustic identification signals from any of the multiple candidate audio communication devices to determine that no candidate audio communication device matches the observed audio communication device according to one aspect of the disclosure.

FIG. 3 depicts the electronic device 111 receiving no acoustic identification signals from any of the multiple candidate audio communication devices to determine that none of the candidate audio communication devices matches the observed audio communication device according to one aspect of the disclosure. Similar to FIG. 2, the electronic device 111 visually observes the audio communication device 121 in a room but is unable to identify it based on the visual image or based on the strength or directionality of the wireless signals in the room. The electronic device 111 may transmit commands to each candidate audio communication device 201, 203, 205, 207, and 209 to play an acoustic identification signal in sequence.

If none of the candidate audio communication device 201, 203, 205, 207, and 209 are in the local acoustic environment of the electronic device 111 (e.g., in the same room), the electronic device 111 detects silence in the playback time slots assigned to candidate audio communication devices 201, 203, 205, 207 and 209. In one example, if some of the candidate audio communication devices are in the same room but are outside the field of view of the camera of the electronic device 111, or are in an adjacent room, the electronic device 111 may receive acoustic identification signals from these candidate audio communication devices. The electronic device 111 may construct the metrics for these candidate audio communication devices. However, because the metrics such as the times of flight, directions of arrival, received amplitudes, received spectral content relative to transmitted spectral content, and DDR of these candidate audio communication devices do not correspond to the metrics estimated for the observed audio communication device 121, the confidence scores computed for these candidate audio communication devices based on the metrics may be low. The electronic device 111 may declare that none of the candidate audio communication device 201, 203, 205, 207, and 209 is the observed audio communication device 121 when none of the confidence scores exceeds the detection threshold.

Figure 4:
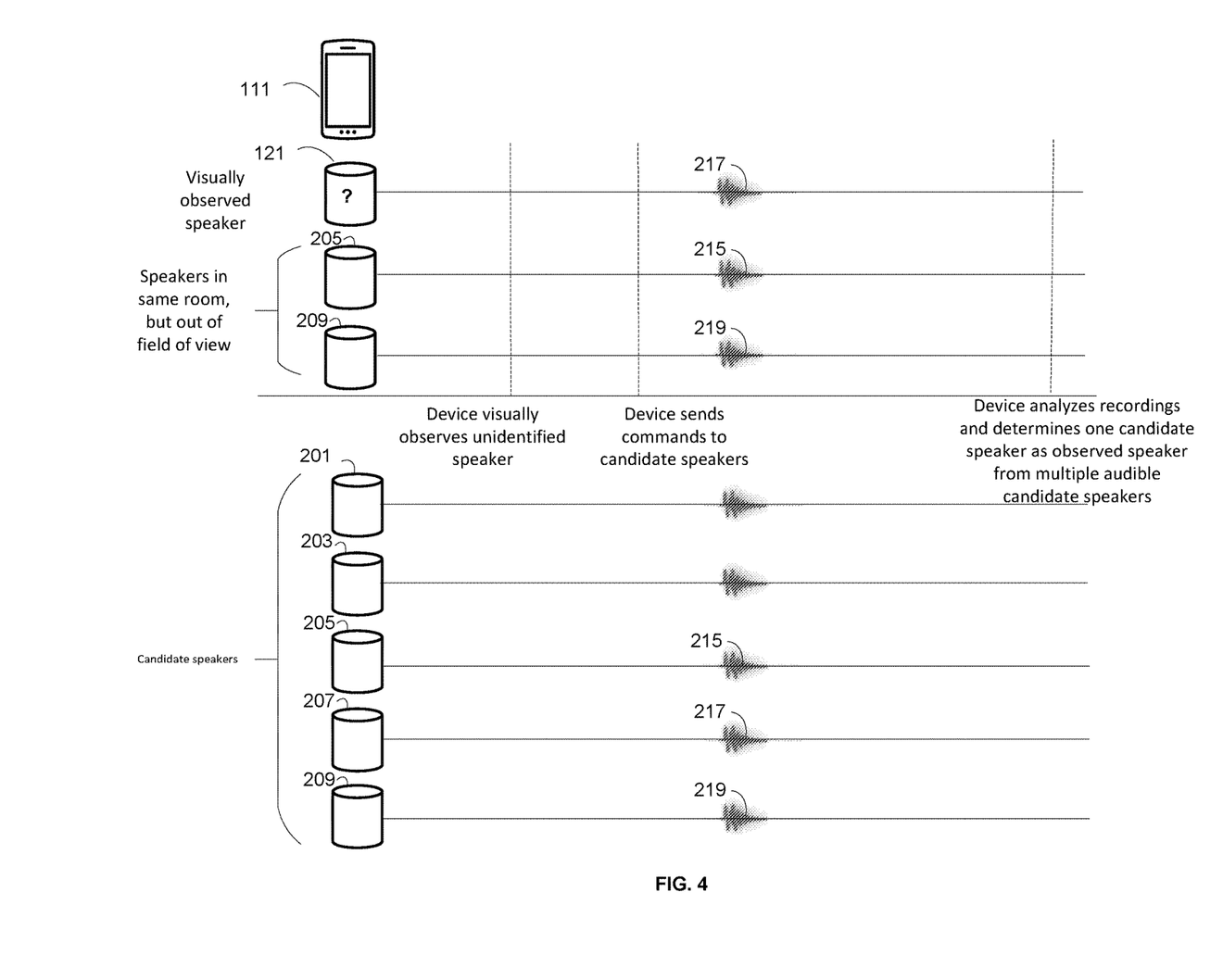
FIG. 4 depicts the electronic device receiving acoustic identification signals from multiple candidate audio communication devices to identify one of the candidate audio communication devices as the observed audio communication device according to one aspect of the disclosure.

FIG. 4 depicts the electronic device 111 receiving acoustic identification signals from multiple candidate audio communication devices to identify one of the candidate audio communication devices as the observed audio communication device according to one aspect of the disclosure. Similar to FIGS. 2 and 3, the electronic device 111 visually observes the audio communication device 121 in a room but is unable to identify it based on the visual image or based on the strength or directionality of the wireless signals in the room. However, unlike FIGS. 2 and 3, the electronic device 111 may transmit commands to each candidate audio communication device 201, 203, 205, 207, and 209 to play their acoustic identification signals simultaneously.

If candidate audio communication devices 205, 207, and 209 are in the same room as the electronic device 111, the electronic device 111 may receive the acoustic identification signals 215, 217, and 219 from candidate audio communication devices 205, 207, and 209 respectively. The electronic device 111 may also receive metadata such as information about the unique fingerprinting sequences embedded in the acoustic identification signals from candidate audio communication devices 201, 203, 205, 207, and 209 wirelessly. The electronic device 111 may use the fingerprinting sequence for a candidate audio communication device as a reference signal to receive and recover the acoustic identification signal from the candidate audio communication device. For example, the electronic device 111 may use the fingerprinting sequences for candidate audio communication devices 205, 207, and 209 to receive the acoustic identification signals 215, 217, and 219, respectively. Because candidate audio communication devices 201 and 203 are not in the local acoustic environment of the electronic device 111, the electronic device 111 does not receive the acoustic identification signals from candidate audio communication devices 201 and 203 when their fingerprinting sequences are used as reference signals.

The electronic device 111 may construct the metrics for candidate audio communication devices 205, 207, and 209 to compute their corresponding confidence scores. If only candidate audio communication device 207 is within the electronic device's field of view, the metrics such as the time of flight, direction of arrival, received amplitude, received spectral content relative to transmitted spectral content, and DDR of candidate audio communication device 207 may correspond most closely with the metrics estimated for the observed audio communication device 121. The confidence score computed for candidate audio communication device 207 may be the highest and if it exceeds the detection threshold, the electronic device 111 may identify candidate audio communication device 207 as the most likely candidate for the observed audio communication device 121.

Figure 5:
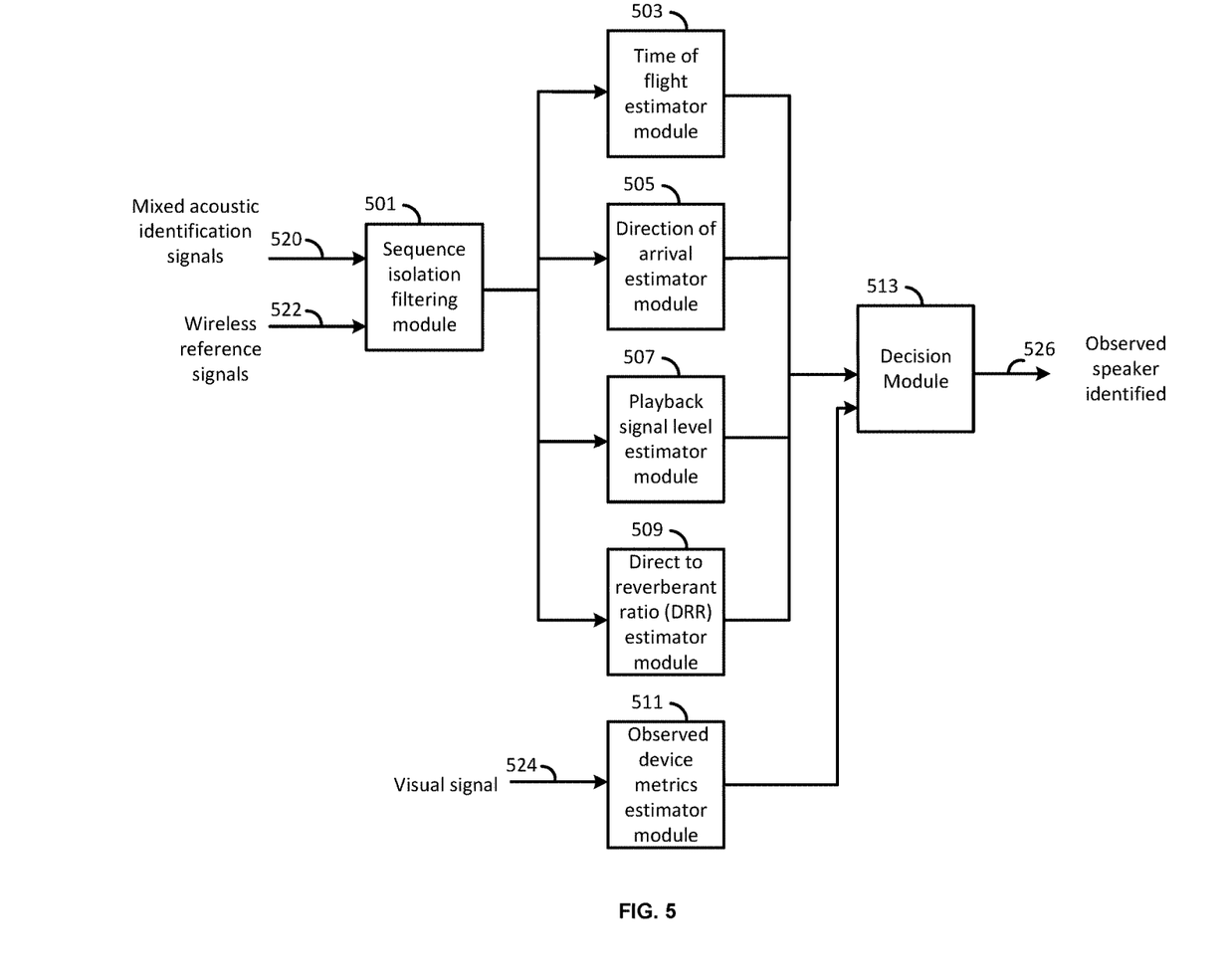
FIG. 5 is a functional block diagram of a processing system of the electronic device used to identify which one of the received acoustic identification signals is most likely generated by the observed audio communication device according to one aspect of the disclosure.

FIG. 5 is a functional block diagram of a processing system of the electronic device 111 used to identify which one of the received acoustic identification signals is most likely generated by the observed audio communication device 121 according to one aspect of the disclosure. A sequence isolation filtering module 501 may receive mixed acoustic identification signals 520 from candidate audio communication devices that have been commanded by the electronic device 111 to play the acoustic identification signals 520 simultaneously, as in FIG. 4. The mixed acoustic identification signals 520 may embed fingerprinting sequences unique to each candidate audio communication device. The sequence isolation filtering module 501 may also receive wireless reference signals 522 containing the unique fingerprinting sequence for each candidate audio communication device that is decoded from metadata received by the electronic device 111 wirelessly from the candidate audio communication devices. The sequence isolation filtering module 501 may use the wireless reference signals 522 unique to each candidate audio communication device to receive and recover the acoustic identification signals for the candidate audio communication device from the mixed acoustic identification signals 520. In one aspect, the sequence isolation filtering module 502 may perform a correlation between the mixed acoustic identification signals 520 and the wireless reference signals 522 for each candidate audio communication device to extract the acoustic identification signal corresponding to each candidate audio communication device.

The extracted acoustic identification signal for each candidate audio communication device may be used to construct various metrics. For example, a time of flight estimator module 503 may estimate the time of flight of the acoustic identification signal for a candidate audio communication device based on the difference in the timestamp of arrival and the playback timestamp received in the metadata from the candidate audio communication device. A direction of arrival estimator module 505 may estimate the direction of arrival of the acoustic identification signal for the candidate audio communication device based on the direction of the microphone beam-forming. A playback signal level estimator module 507 may estimate the received amplitude level of the acoustic identification signal or the spectral content of the received acoustic identification signal relative to the transmitted acoustic identification signal for the candidate audio communication device. A DRR estimator module 509 may estimate the DRR of the acoustic identification signal for the candidate audio communication device by extracting the direct component and the reverberant component of the acoustic identification signal such as by using a neural network.

An observed device metrics estimator module 511 may estimate the metrics for the observed audio communication device based on the captured image data of the observed audio communication device provided by the visual signal 524 from the camera or image sensors. For example, the observed device metrics estimator module 511 may estimate the distance, the direction, the expected amplitude, the expected received spectral content relative to the transmitted spectral content of the acoustic identification signal based on the estimated distance, etc., of the observed audio communication device using the visual signal 524.

A decision module 513 may compute a confidence score for each candidate audio communication device based on the combination of metrics computed for the candidate audio communication device and the estimated metrics for the observed audio communication device. In one aspect, the decision module may receive acoustic parameters such as a DRR threshold computed based on the room geometry as part of the estimated metrics for the observed audio communication device. The confidence score for a candidate audio communication device measures the level of correspondence between the computed metrics for the candidate audio communication device and the estimated metrics for the observed audio communication device, and thus may reflect the degree of likelihood that the candidate audio communication device is the observed audio communication device. The decision module 513 may select the highest confidence score among the candidate audio communication devices and if the highest confidence score exceeds a detection threshold, the decision module 513 may identify the corresponding candidate audio communication device as the most likely candidate for the observed audio communication device at the output signal 526. In one aspect, if the highest confidence score is below the detection threshold but is above a lower confidence threshold, the decision module 513 may prompt the user for manual confirmation of the candidate audio communication device or to request additional intervention.

Figure 6:
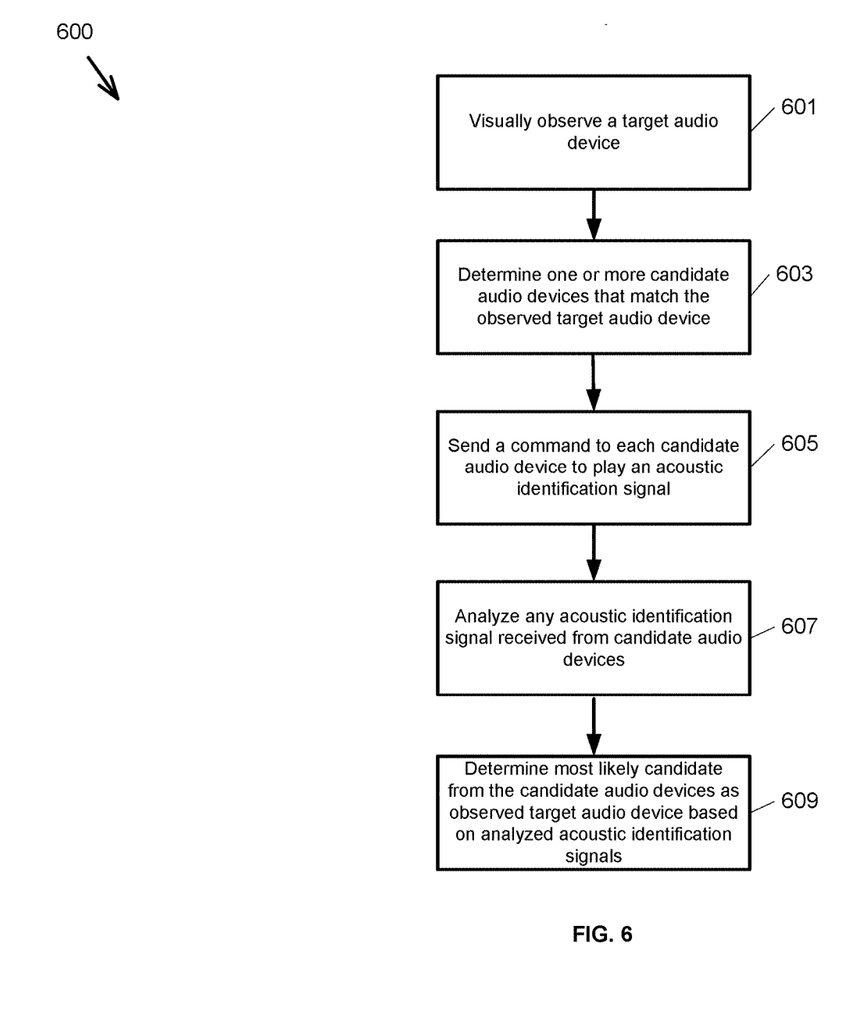
FIG. 6 is a flow diagram of a method for a device with audio and video capturing capability to identify the most likely candidate audio communication device based on received acoustic identification signals from multiple candidate audio communication devices according to one aspect of the disclosure.

FIG. 6 is a flow diagram of a method 600 for a wireless device with audio and video capturing capability to identify the most likely candidate audio communication device based on the received acoustic identification signals from multiple candidate audio communication devices according to one aspect of the disclosure. The method 600 may be practiced by the electronic device 111 of FIGS. 1, 2, 3, and 4, or by the processing system of FIG. 5.

In operation 601, the method 600 visually observes a target audio communication device. The device may use image sensors (e.g., a camera) to capture an image of the target audio communication device within its field of view. The device may run an object recognition algorithm on the captured image, but is unable to identify the observed target audio communication device as one from a database of audio communication devices associated with a user of the device.

In operation 603, the method 600 determines one or more candidate audio communication devices that may match the observed target audio communication device. The one or more candidate audio communication devices may be assembled from the database of audio communication devices associated with the user of the device based on the similarity of their physical characteristics to the physical characteristics of the observed target audio communication device, similarity of their wireless capabilities to the characteristics of wireless signals detected in the environment, proximity of their locations to the location of the observed target audio communication device, etc.

In operation 605, the method 600 sends a command to each candidate audio communication device to play an acoustic identification signal that is used to uniquely identify each candidate audio communication device. The command may be transmitted wirelessly to each candidate audio communication device. The command may include metadata such as a request for a playback timestamp, a request for information about the acoustic identification signal or unique fingerprinting sequence embedded in the acoustic identification signal, etc.

In operation 607, the method 600 analyzes the acoustic identification signal received from any of the one or more candidate audio communication devices. The acoustic identification signal may be transmitted by each candidate audio communication device at a pre-determined level. In one aspect, the received acoustic identification signal may contain temporally separated acoustic identification signal from each candidate audio communication device. In one aspect, the received acoustic identification signal may embed unique fingerprinting sequence from each candidate audio communication devices mixed in time. The method 600 may use metadata information about the fingerprinting sequence received wirelessly from a candidate audio communication device as a reference signal to extract the acoustic identification signal for the candidate audio communication device from the mixed signal. Operation 605 may analyze the acoustic identification signal to generate metrics including the time of flight, the direction of arrival, the received amplitude level, the received spectral content relative to the transmitted spectral content, the DRR, etc., of the acoustic identification signal corresponding to a candidate audio communication device.

In operation 609, the method 600 determines the most likely candidate among the candidate audio communication devices as the observed target audio communication device based on the analysis of the acoustic identification signals. Operation 607 may compute a confidence score for each candidate audio communication device whose acoustic identification signal was received based on the computed metrics for the candidate audio communication device and estimated metrics for the observed target audio communication device. The metrics for the observed target audio communication device, such as the estimated direction or distance of the observed target audio communication device, may be estimated from the captured image. The confidence score for a candidate audio communication device may reflect the degree of likelihood that the candidate audio communication device is the observed target audio communication device based on the level of correspondence between the computed metrics for the candidate audio communication device and the estimated metrics for the observed target audio communication device. The highest confidence score among the candidate audio communication devices may be selected and if the highest confidence score exceeds a detection threshold, operation 607 may identify the corresponding audio communication device as the most likely candidate for the observed target audio communication device.

Embodiments of the technique for multimedia devices with audio and video capturing capabilities to identify an observed audio communication device based on acoustic identification signals as described herein may be implemented in a data processing system, for example, by a network computer, network server, tablet computer, smartphone, laptop computer, desktop computer, other consumer electronic devices or other data processing systems. In particular, the operations described for acoustical identification of audio communication devices are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:
   capturing an image of a target electronic device;
   transmitting a command to one or more candidate electronic devices to output an identification signal;
   generating corresponding metrics for each candidate electronic device of a subset of candidate electronic devices by processing corresponding identification signals received from the subset; and
   determining one candidate electronic device from the subset as the target electronic device based on the corresponding metrics for the candidate electronic devices from the subset and the image of the target electronic device.

2. The method of claim 1 further comprising determining whether the target electronic device fails to be uniquely identified from a database of previously recognized electronic devices based on the image of the target electronic device, wherein the command is transmitted responsive to determining that the target electronic device has failed to be uniquely identified from the database.

3. The method of claim 1 further comprising determining the one or more candidate electronic devices using one or more physical characteristics of the target electronic device based on the image of the target electronic device.

4. The method of claim 1, wherein transmitting the command to the one or more candidate electronic devices to output the identification signal comprises wirelessly transmitting the command to enable the one or more candidate electronic devices to output their corresponding identification signals sequentially in time or simultaneously.

5. The method of claim 1, wherein the command comprises one or more of:
   a request for a timestamp when the identification signal is output;
   a request for information about a unique fingerprinting sequence embedded in the identification signal;
   an encryption key used to encrypt the fingerprinting sequence; or
   information used to select the fingerprinting sequence.

6. The method of claim 1, wherein the corresponding metrics for each of the candidate electronic devices from the subset comprise one or more of:
   a time of flight of the corresponding identification signal;
   a direction of arrival of the corresponding identification signal; or
   a received amplitude level of the corresponding identification signal.

7. The method of claim 1, wherein determining the one candidate electronic device from the subset of the candidate electronic devices as the target electronic device comprises:
   determining metrics for the target electronic device based on the image of the target electronic device;
   determining a confidence score for each of the candidate electronic devices from the subset based on a level of correspondence between the corresponding metrics for each of the candidate electronic devices from the subset and the metrics for the target electronic device; and
   identifying the candidate electronic device having a highest confidence score as the target electronic device.

8. An electronic device comprising:
   at least one processor; and
   memory having instructions stored therein which when executed by the at least one processor causes the electronic device to:
   receive an image of a target electronic device,
   transmit a command to one or more candidate electronic devices to output an identification signal,
   generate corresponding metrics for each candidate electronic device of a subset of candidate electronic devices by processing corresponding identification signals received from the subset, and
   determine one candidate electronic device from the subset as the target electronic device based on the corresponding metrics for the candidate electronic devices from the subset and the image of the target electronic device.

9. The electronic device of claim 8, wherein the target electronic device and the one or more candidate electronic devices are devices that include at least one speaker.

10. The electronic device of claim 8, wherein the memory has further instructions to determine the one or more candidate electronic devices using one or more physical characteristics of the target electronic device based on the image of the target electronic device.

11. The electronic device of claim 8, wherein the command is wirelessly transmitted to the one or more candidate electronic devices to enable the one or more candidate electronic devices to output their corresponding identification signals sequentially in time or simultaneously.

12. The electronic device of claim 8, wherein the command comprises one or more of:
   a request for a timestamp when the identification signal is output;
   a request for information about a unique fingerprinting sequence embedded in the identification signal;
   an encryption key used to encrypt the fingerprinting sequence; or
   information used to select the fingerprinting sequence.

13. The electronic device of claim 8, wherein the corresponding metrics for each of the candidate electronic devices from the subset comprise one or more of:
- a time of flight of the corresponding identification signal;
- a direction of arrival of the corresponding identification signal; or
- a received amplitude level of the corresponding identification signal.

14. The electronic device of claim 8, wherein the instructions to determine the one candidate electronic device from the subset of the candidate electronic devices as the target electronic device comprises instructions to:
- determine metrics for the target electronic device based on the image of the target electronic device;
- determine a confidence score for each of the candidate electronic devices from the subset based on a level of correspondence between the corresponding metrics for each of the candidate electronic devices from the subset and the metrics for the target electronic device; and
- identify the candidate electronic device having a highest confidence score as the target electronic device.

15. A non-transitory machine-readable medium having instructions which when executed by at least one processor causes the at least one processor to:
- receive an image of a target electronic device,
- transmit a command to one or more candidate electronic devices to output an identification signal,
- generate corresponding metrics for each candidate electronic device of a subset of candidate electronic devices by processing corresponding identification signals received from the subset, and
- determine one candidate electronic device from the subset as the target electronic device based on the corresponding metrics for the candidate electronic devices from the subset and the image of the target electronic device.

16. The non-transitory machine-readable medium of claim 15, wherein the non-transitory machine-readable medium has further instructions to determine the one or more candidate electronic devices using one or more physical characteristics of the target electronic device based on the image of the target electronic device.

17. The non-transitory machine-readable medium of claim 15, wherein the command is wirelessly transmitted to the one or more candidate electronic devices to enable the one or more candidate electronic devices to output their corresponding identification signals sequentially in time or simultaneously.

18. The non-transitory machine-readable medium of claim 15, wherein the command comprises one or more of:
- a request for a timestamp when the identification signal is output;
- a request for information about a unique fingerprinting sequence embedded in the identification signal;
- an encryption key used to encrypt the fingerprinting sequence; or
- information used to select the fingerprinting sequence.

19. The non-transitory machine-readable medium of claim 15, wherein the corresponding metrics for each of the candidate electronic devices from the subset comprise one or more of:
- a time of flight of the corresponding identification signal;
- a direction of arrival of the corresponding identification signal; or
- a received amplitude level of the corresponding identification signal.

20. The non-transitory machine-readable medium of claim 15, wherein the instructions to determine the one candidate electronic device from the subset of the candidate electronic devices as the target electronic device comprises instructions to:
- determine metrics for the target electronic device based on the image of the target electronic device;
- determine a confidence score for each of the candidate electronic devices from the subset based on a level of correspondence between the corresponding metrics for each of the candidate electronic devices from the subset and the metrics for the target electronic device; and
- identify the candidate electronic device having a highest confidence score as the target electronic device.

* * * * *